United States Patent
Baker et al.

(10) Patent No.: US 7,062,224 B2
(45) Date of Patent: Jun. 13, 2006

(54) METHOD AND SYSTEM FOR IDENTIFYING AND MONITORING REPEATER TRAFFIC IN A CODE DIVISION MULTIPLE ACCESS SYSTEM

(75) Inventors: Kenneth R. Baker, Boulder, CO (US); Brian K. Butler, La Jolla, CA (US); Charles E. Wheatley, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 10/316,780

(22) Filed: Dec. 10, 2002

(65) Prior Publication Data

US 2003/0220075 A1 Nov. 27, 2003

Related U.S. Application Data

(60) Provisional application No. 60/348,198, filed on Jan. 9, 2002.

(51) Int. Cl.
*H04B 1/60* (2006.01)
(52) U.S. Cl. .............................. 455/9; 455/15; 455/23; 370/315
(58) Field of Classification Search .................. 455/7, 455/9, 23, 11.18, 15, 16, 24; 370/315, 522
See application file for complete search history.

(56) References Cited

U.S. PATENT DOCUMENTS

| | | | |
|---|---|---|---|
| 3,670,249 A | * | 6/1972 | Meslener ...................... 341/72 |
| 5,210,632 A | | 5/1993 | Murakami et al. |
| 5,440,418 A | | 8/1995 | Ishimura et al. |
| 6,501,955 B1 | * | 12/2002 | Durrant et al. ............. 455/7 X |

FOREIGN PATENT DOCUMENTS

| | | |
|---|---|---|
| EP | 0935356 | 8/1999 |
| EP | 1093273 | 4/2001 |

* cited by examiner

*Primary Examiner*—Matthew Anderson
*Assistant Examiner*—Philip J. Sobutka
(74) *Attorney, Agent, or Firm*—Philip Wadsworth; Charles D Brown; Howard H. Seo

(57) ABSTRACT

An apparatus and method for identifying remote communications transmitted via a repeater from remote communications not transmitted via the repeater. The method comprises the steps of receiving a plurality of signal transmissions originating from a plurality of remote stations, wherein each of the signal transmissions is associated with a call originating from one of the plurality of remote stations; processing the plurality of received signal transmissions to identify received transmissions that include a discriminant applied by a repeater; and designating each of the plurality of received signal transmissions as being transmitted via the repeater if the received signal transmission includes the discriminant.

67 Claims, 14 Drawing Sheets

METHOD AND SYSTEM FOR IDENTIFYING AND MONITORING REPEATER TRAFFIC IN A CODE DIVISION MULTIPLE ACCESS SYSTEM

CROSS-REFERENCE TO RELATED APPLICATIONS

This application claims benefit of U.S. Provisional Patent Application Ser. No. 60/348,198, entitled "METHOD AND SYSTEM FOR IDENTIFYING REPEATER TRAFFIC IN A CDMA MULTIPLE ACCESS SYSTEM," by Kenneth Robert Baker, filed Jan. 9, 2002, and This application is also continuation-in-part of the following co-pending and commonly assigned patent application, which application is incorporated by reference herein:

application Ser. No. 10/004,177, entitled "METHOD AND SYSTEM FOR IDENTIFYING REPEATER TRAFFIC IN A CODE DIVISION MULTIPLE ACCESS SYSTEM," filed Oct. 25, 2001, by Kenneth Robert Baker and Brian Butler.

BACKGROUND

1. Field of the Invention

The present invention relates to methods and systems for transceiving information between mobile stations and base stations, and in particular to a method and system for determining if a received message was transmitted via a repeater.

2. Description of the Related Art

Cellular telephone (cellphone) service has become widespread. In some service areas, it has become mandatory that cellphone service providers incorporate features into the cellphone network that allow the location of the cellphone user to be determined. These services are useful for, among other things, emergency calls (911 and the like).

In providing this service, difficulties arise when the cellphone user is communicating with the base station of the cell via a repeater. In such circumstances, the position determination system cannot distinguish where the cellphone user is, since such systems typically do not identify the signal to the user as having been received from the repeater, and the usual means of determining the user's location (e.g. triangulation using signal strength and other signal measures) can be compromised by passing through the repeater. For example, a repeater typically adds 4–10 µsec to the signal propagation time, which can cause position ambiguities. Further, forward link signals received from a repeater are indistinguishable from those forward link signals received directly from a base station.

It is also desirable in some circumstances to monitor network traffic, particularly traffic passing through the repeaters. This allows monitoring of call statistics in a repeater area. This capability is also difficult to implement unless the base stations are capable of identifying which received transmissions were received via the repeater and which were not (e.g. received directly from the cellphone).

What is needed is a simple system and method for identifying whether a particular cellphone transmission was received directly from the mobile station, or whether the transmission was received via a repeater. What is also needed is a simple system that is operational with cellular telephone systems that include power control capabilities. The present invention satisfies these needs.

What is also needed is a simple system and method for identifying whether a particular base station transmission was received directly from the base station, or whether the transmission was received via a repeater. What is also needed is a simple system that is operational with cellular telephone systems that include power control capabilities. The present invention also satisfies these needs.

SUMMARY

To address the requirements described above, an embodiment of the present invention discloses a method and apparatus for monitoring remote communications traffic. At least one of a plurality of signal transmissions is received, wherein each of the signal transmissions is associated with a call associated with one of a plurality of remote stations or with the overhead signaling information that is transmitted from a base station. The plurality of received signal transmissions are processed to identify received transmissions that include a discriminant applied by a repeater, and each of the plurality of received signal transmissions is designated as being transmitted via the repeater if the received signal transmission includes the discriminant.

The apparatus comprises a receiver configured to receive a plurality of signal transmissions originating from a plurality of remote stations, wherein each of the signal transmissions is associated with a call originating from one of the plurality of remote stations, and a processor, communicatively coupled to the receiver, the processor configured to identify received transmissions that include a discriminant applied by a repeater and to designate each of the plurality of received signal transmissions as being transmitted via the repeater if the received signal transmission includes the discriminant.

An embodiment of the present invention permits the monitoring of a variety of different call and signal characteristics, including the average and standard deviation of the number of calls handled by the repeater per given time interval (which typically varies at different times of day), the length of each call handled by the repeater, the number of dropped calls handled by the repeater. Further, the statistics collected regarding calls handled by the repeater can be compared to similar statistics for calls which are transmitted without the repeater (e.g. comparing dropped calls, call volume, and other factors) to assess repeater performance and whether the sector serviced by the repeater would be better serviced by a base station. The present invention also discloses an embodiment in which the output power of signals emanating from the repeater on the reverse link (from the remote station or cellphone to the base station) remain substantially constant. This permits the power control system to operate without the extra burden of compensating for power fluctuations caused by the discriminant added at the repeater. This also allows the level of "interference" that the repeater provides to other users of the base station to be reduced (e.g. the repeater does not desensitize receivers in the base stations by adding extra receive power above and beyond what a normal repeater might add to the base station receivers. Further, the present invention is usable with a wide variety of mobile telephony waveforms, including CDMA (IS-95 and now CDMA2000), Ev-DO (sometimes HDR), Ev-DV, W-CDMA, and GSM.

An embodiment of the present invention also permits the repeaters to be controlled, using knowledge regarding which forward and reverse link transmissions were handled by each repeater, as well as other information such as remote station location. For example:

(1) The information can be used to change the forward link gain, thus increasing (or decreasing) the repeater coverage area (the area serviced by the repeater).

(2) Generally, if the forward link gain is altered, similar adjustments must be made in the reverse link gain. Reverse link gain can be adjusted to compensate for changes in path loss or gain changes within the repeater (e.g. those due to temperature variation). Information regarding which forward and reverse link transmissions were handled by which repeater can also be used to control the reverse link gain, setting the balance between the forward and reverse links as seen by the remote stations in the repeater coverage area. Repeater gain can also be controlled to prevent undesirable operational characteristics such as transmitter oscillation.

(3) The information can be used to activate and deactivate the repeater, based on, for example, (a) how many (or whether any) remote stations are using the repeater or a repeater adjacent a particular repeater, (b) whether the repeater is operating properly, and or (c) whether the repeater is only required at certain times of the day or week.

(4) The information can be used to adjust channels that are rebroadcast by the repeater, including selecting the active channels and selecting the frequency and/or bandwidth of the selected active channels. This feature may be useful, for example in a case where a particular frequency is being heavily used. In this situation, it may be desirable to make a particular repeater (e.g. one that is covering a subway) use a different frequency to share the message traffic load.

BRIEF DESCRIPTION OF THE DRAWINGS

Referring now to the drawings in which like reference numbers represent corresponding parts throughout.

DETAILED DESCRIPTION

In the following description of an embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Figure 1:
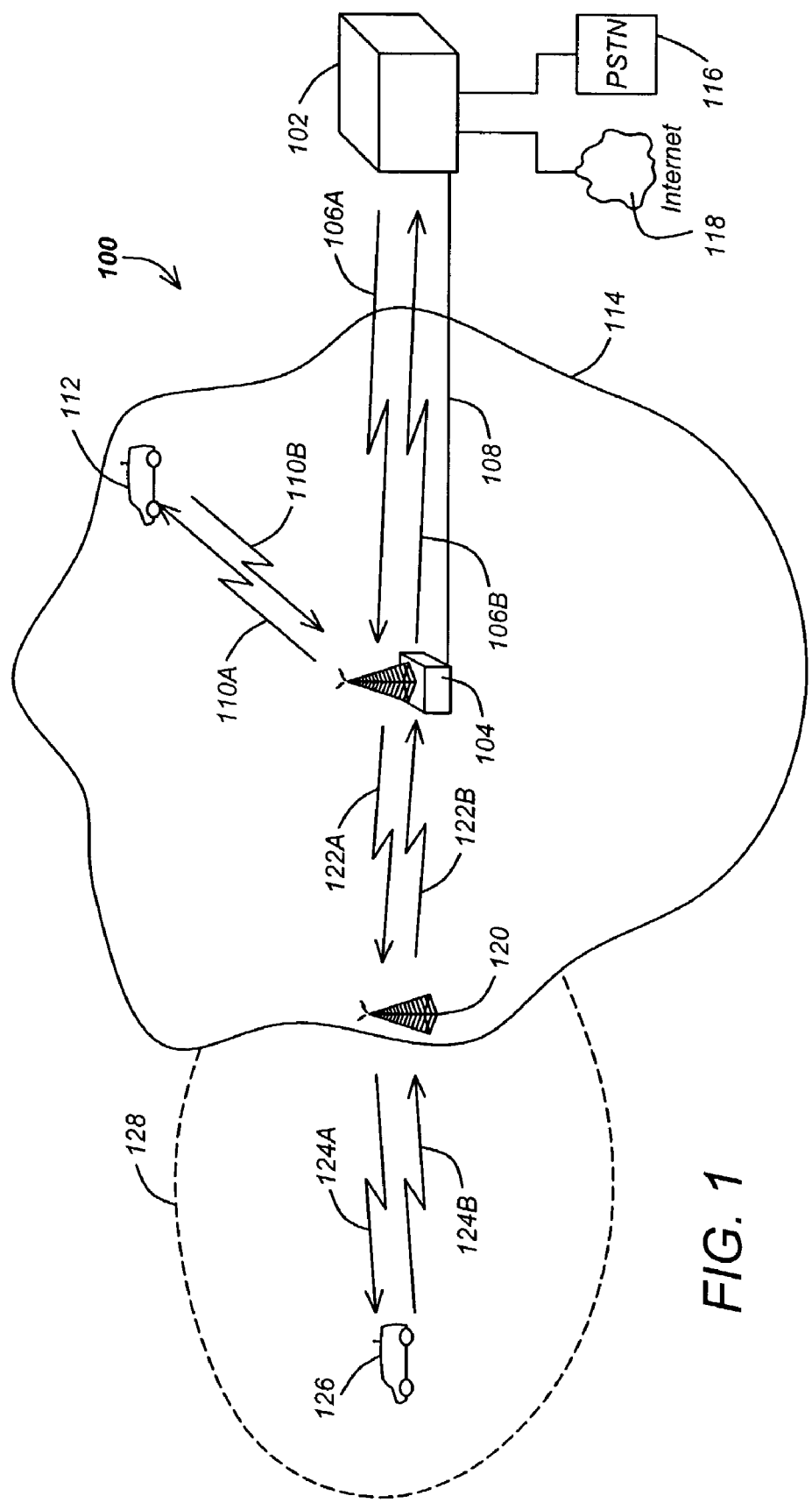
FIG. 1 is a diagram of a cellular telephone system.

FIG. 1 is a diagram of a cellular telephone system 100. The cellular telephone system 100 comprises one or more control stations 102, and a plurality of base stations 104. The base stations 104 communicate with remote stations 112 that are within the service area 114 of the base station 104. The remote stations 112 may be mobile stations (e.g. car phones or handheld cellphones) or fixed stations. The service area 114 is generally described as the geographical extent of a locus of points for which a remote station 112 can communicate effectively with the base station. Although the shape of the service area 114 is illustrated as more or less circular in FIG. 1, the actual shape is dictated by geographical obstructions and other factors. Multiple service areas 114 generally overlap to provide cellular telephone service over a wide area.

When a remote station 112 is within the service area 114, messages can be transmitted from the control center 102 to the base station 104 via forward link 106A, and from the base station 104 to the remote station 112 via forward link 110A. Messages are transmitted from the remote station 112 to the base station 104 via link 110B. These messages are transmitted to the control center 102 via the return link 106B. Some or all of the communications between the base station 104 and the control station 102 can be carried via landline 108 if desired. Also, messages transmitted via the forward links 106A and 110A are typically modulated in different frequency bands or modulation techniques than the messages transmitted via reverse links 110B and 106B. The use of separate forward and reverse links allows full duplex communications between the control center 102 and the remote station 112.

The control station 102 is communicatively coupled to other communication portals such as the public switched telephone network (PSTN) 116 or the Internet 118. Thus, the user at the remote station 112 is provided with access to the communication portals via the cellular telephone system 100.

While it is possible to extend coverage of the cellular telephone network 100 by simply adding more base stations 104 to cover additional geographical territory, it is sometimes uneconomical to do so. In many cases, for example, the territory sought to be covered has only enough traffic to justify the use of a repeater 120 instead of a base station 104. The repeater 120 accepts transmissions from both the mobile station 126 and the base station 104 and acts as an intermediary between the two, essentially a "bent pipe" communication portal. Using the repeater 120, the effective range of the base station 104 is extended to cover extended service area 128. Repeaters 120 may include terrestrially-based repeaters, atmospherically deployed repeaters, or repeaters disposed on satellites in geosynchronous (GEO), Middle-Earth Orbits (MEO), Low-Earth Orbits (LEO). Repeaters 120 may also be fixed or mobile.

While the use of repeaters 120 is a cost effective way to increase range, it has its disadvantages. The use of a large number of repeaters 120 instead of additional base stations 104 places greater demands on the base stations 104 to handle traffic (since the base station 104 is handling traffic for an extended service area 128, thus imposing additional traffic on the base station 104). Use of the repeater 120 also compromises the ability of the system to determine the location of the remote station 126. This is due at least in part to the fact that signals passing through the repeater 120 are subject to delays that are not present in signals that are transmitted directly from the remote station 126 to the base station 104. The use of repeaters 120 also compromises the accuracy of location-determining algorithms that rely, at least in part, on the amplitude of the received signal to determine mobile location. Further, some location resolving algorithms initialize themselves using a location estimate derived from the known location of the base station 104 (presuming that the remote station 112 is within the coverage area 114 of the base station). If the remote station 126 is actually outside of the coverage area 114 of the base station 104 but inside the coverage area 128 of the repeater 120, the location estimation algorithms may take longer to converge on a solution or fail to arrive at a solution at all.

Figure 2A:
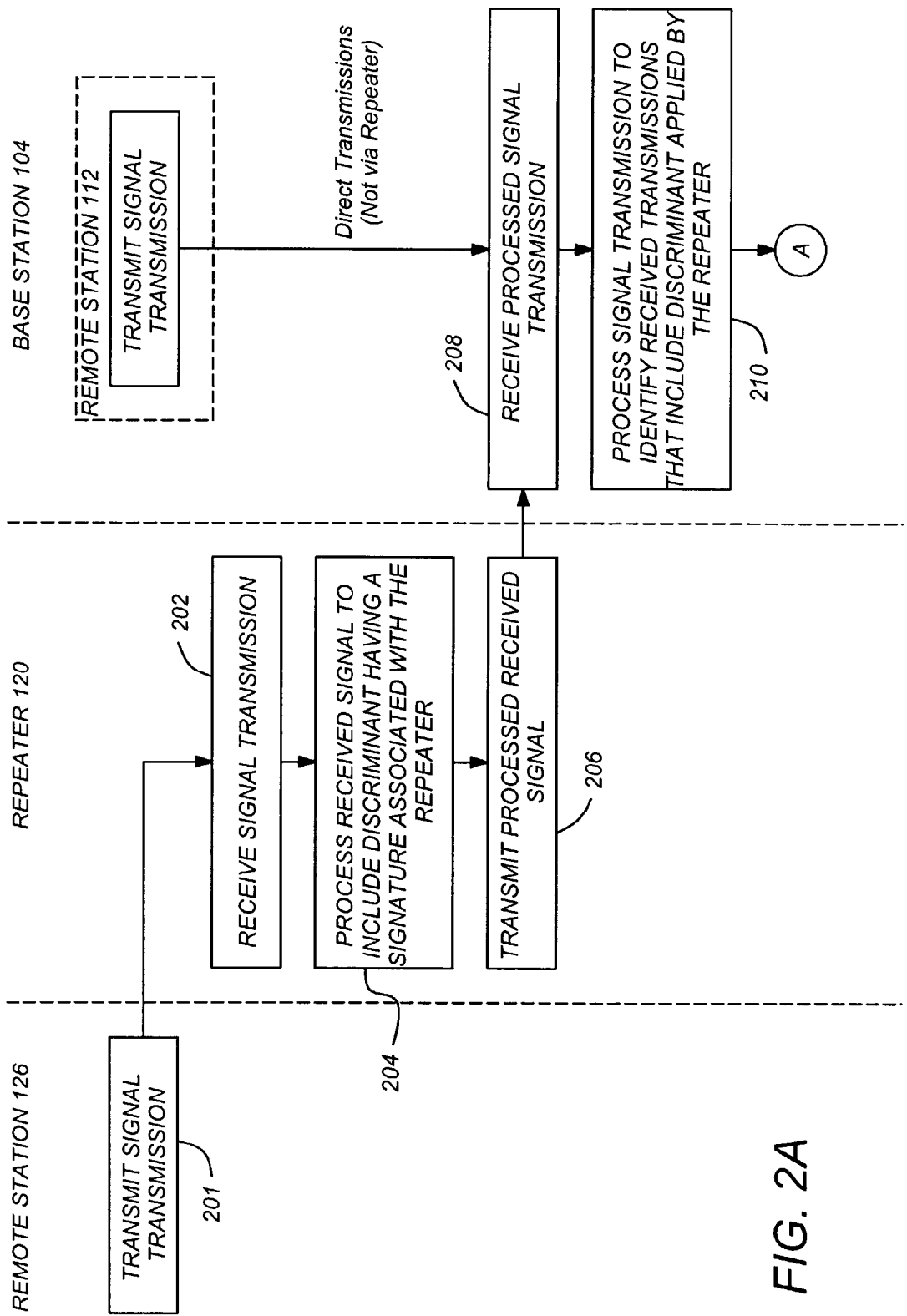
FIGS. 2A and 2B are flow charts illustrating exemplary process steps that can be used to practice one embodiment of the present invention.
Figure 2B:
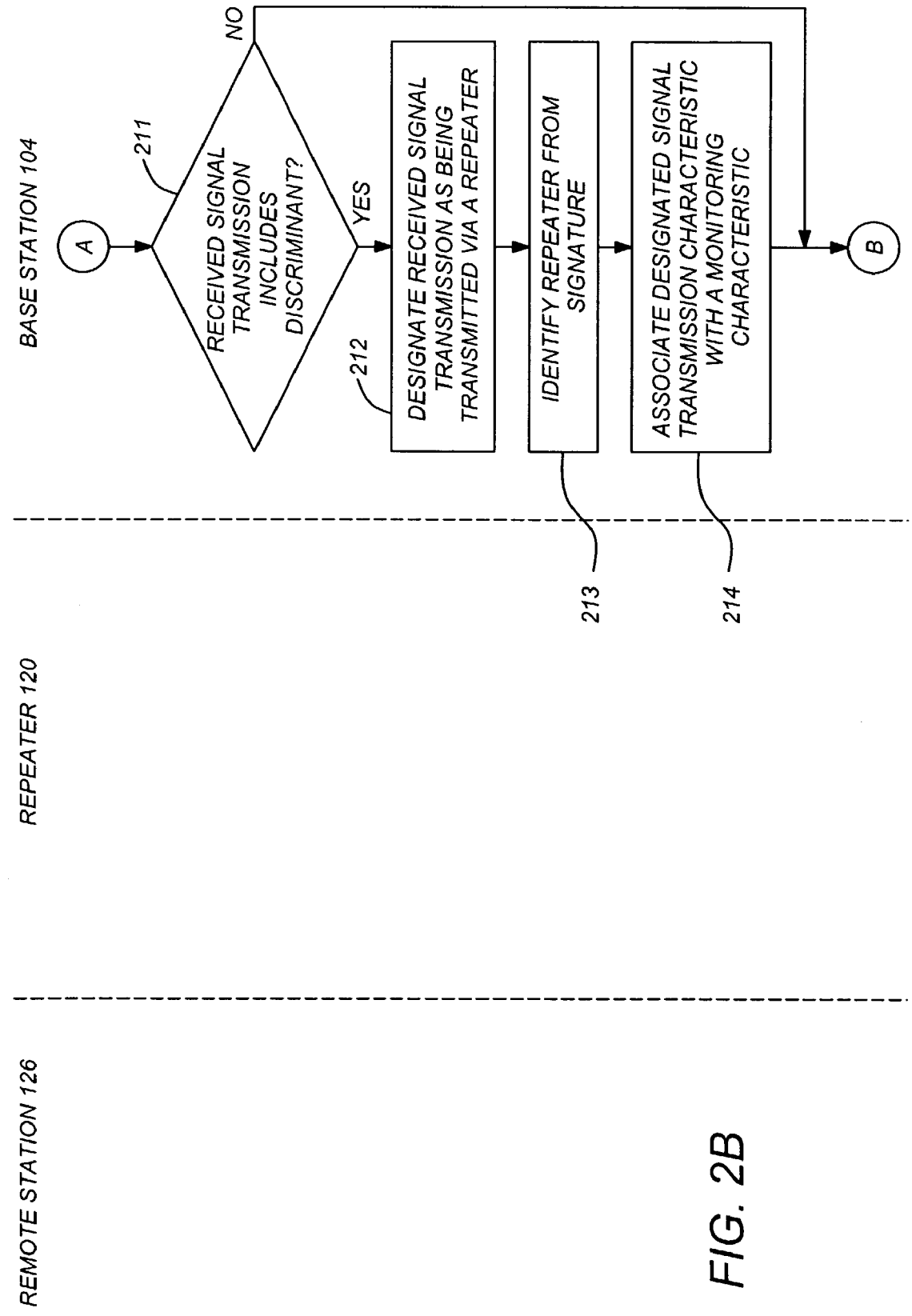

FIGS. 2A and 2B are flow charts illustrating exemplary process steps that can be used to ameliorate the foregoing shortcomings of the cellular telephone system 100. A signal transmission is transmitted from a remote station 126 to a repeater 120, where it is received, as shown in blocks 201 and 202. The signal is processed to include a discriminant having a signature associated with the repeater 120, as shown in block 204. The processed signal is then transmitted from the repeater 120 to a base station 104, as shown in block 206. The signal transmitted by the repeater 120 is then received by the base station 104 as shown in block 208. The received signal is then processed to identify transmissions that include the discriminant applied by the repeater 120, as shown in blocks 210 and 211. At any given time, the base station 104 may receive a plurality of signals, potentially from one or more remote stations disposed 112 within its coverage area, and/or one or more remote stations 126 in the coverage area 128 of the repeater 120. Each of the plurality of signals are examined to determine if they include the discriminant (as shown in block 211), and if so, are designated as being transmitted via a repeater 120. Since there are generally a plurality of base stations 104 and can be more than one repeater 120 associated with each base station 104, the discriminant added to the transmitted signal by each repeater 120 can include a particular signature to distinguish the transmission as having been processed by a particular repeater 120. In such case, the signature is examined and used to determine which repeater 120 the message was transmitted with. This can be accomplished, for example, by comparing the signature of the received signal with a database or list of information relating the signature to the repeater identification. The signature can comprise a frequency (e.g. the frequency of the discriminant identifies the repeater) a time component (e.g. the timing of the discriminant identifies the repeater), or any combination thereof, as further set forth below. If the received signal transmission includes a discriminant, it is designated as having been transmitted via a repeater, as shown in block 212. Such messages may be examined to identify the signature, as shown in block 213. Messaging may be generated to report the signature, along with the call instance that it is associated with, as well as the identifying characteristics of the signal so that the specific repeater can be identified. For example, in one embodiment, messaging flows to a repeater identification database that relates the particular signature to a particular repeater (at this point the call has been registered as being serviced through a specific repeater). Steps can be taken to properly record the call's progress or to properly service any position location needs.

Finally, the signal transmissions designated as having been transmitted via a particular repeater or all repeaters is associated with a monitoring characteristic, as shown in block 214. The monitoring characteristic can include the length of the call associated with the designated signal transmission, a number of calls associated with the designated signal transmissions, and/or a number of dropped calls associated with the designated signal transmissions. From this information, one can monitor dropped calls in a particular repeater area, monitor the amount of call traffic that the repeater is serving as opposed to the call traffic that is being served by the base station directly. The processing and designation operations described above can be performed in the base station 104 or in the control station 102.

The step of processing the received signal to include a discriminant having a signature associated with the repeater (e.g. the step described with respect to block 204 of FIG. 2A) can be performed in a variety of ways. The received signal can be augmented and/or modified with the discriminant. As set forth in greater detail below, the discriminant can take the form of a one or more delay components that are alternately selected or individually temporally variant such that the sum of the power of the signals (and hence, the discriminant) is temporally constant (of course, the use of other discriminants, e.g. FM and code discriminants, obviate the need for substantially constant power output). Discriminants utilizing AM will not have constant output power by definition. Such delay modulation discrimination can be applied in forward link communications through the repeater 120, reverse link communications through the repeater 120, or to both forward and reverse link communications.

The discriminant can also include a signature. For example, the discriminant signature can be the delay of each of the delay components, the period between which the delay components are switched from one to the other, or the contribution of each delay component to the total signal power.

The present invention is not limited to embodiments wherein a discriminant is added to the transmission signal. The foregoing could also be implemented by a system in which the repeater 120 provides the discriminant by removing rather than adding a signal characteristic (e.g. the signal directly from the remote stations 112 may include a modulation, delay or other information that is removed by the repeater 120 before transmission). However, even in this case, the signal passing through the repeater 120 is augmented with a discriminant (the discriminant is now the absence of the modulation that other received signals are expected to have).

The discriminant can take many different forms. In one embodiment, the discriminant is a code. The code may be added to the base signal or information (e.g. by receiving and demodulating the signal received in the repeater 120 from the remote station 126, adding the code, re-modulating and transmitting the signal with the added code to the base station 104), or may be added to the modulated signal itself rather than the demodulated signal. In another embodiment, the discriminant comprises an in-band tone.

In another embodiment, the discriminant is a modulation that is applied to the signal received at the repeater 120 from the remote station 126 without the demodulation of the received signal. The modulation can be amplitude modulation (AM) (e.g. small perturbations to the return link carrier amplitude), phase modulation frequency modulation (FM) (e.g. small perturbations in the return link carrier frequency), pulse modulation, delay modulation (DM), or any combination of such modulation techniques. Exemplary modulation techniques suitable for application with spread spectrum transmissions are discussed in "Spread Spectrum Communications Handbook," by Marvin K. Simon et al. (revised edition, 1994, ISBN 0-07-057629-7), pp. 11–12, which is hereby incorporated by reference herein.

Figure 3:
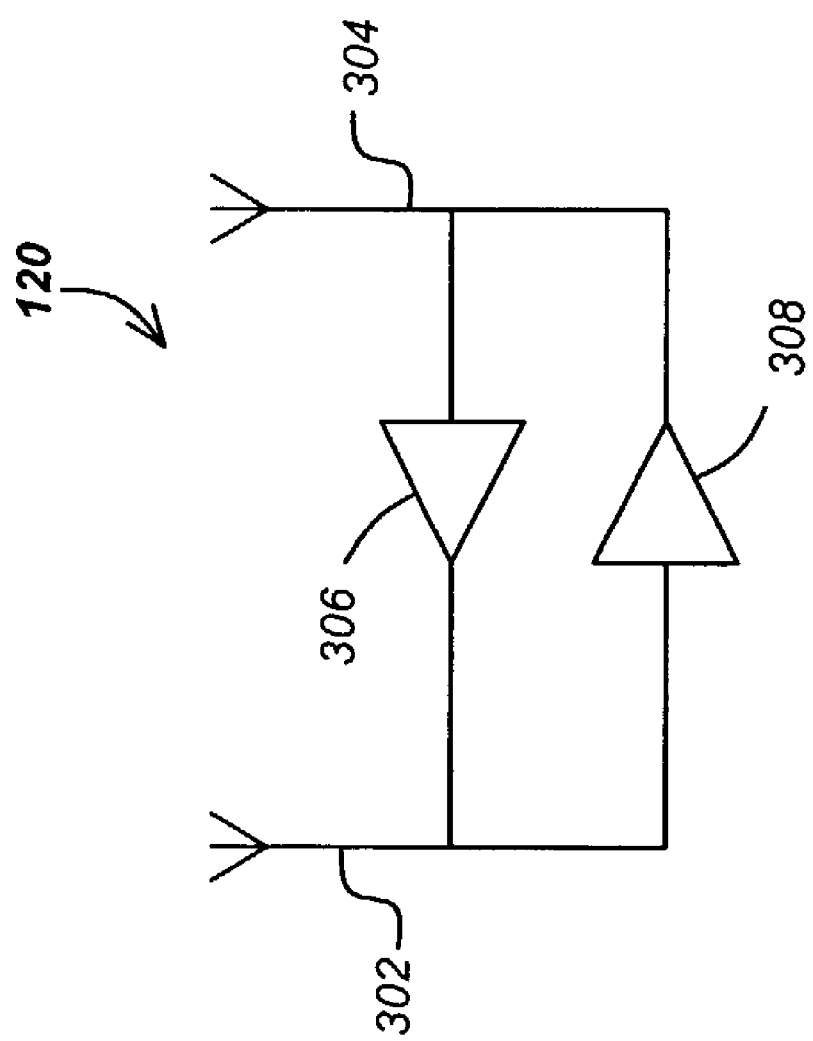
FIG. 3 is a block diagram of a prior art repeater.

FIG. 3 is a block diagram of a prior art repeater 120. The repeater 120 includes a donor antenna 302 for receiving signals, an amplifier 308 for amplifying signals received at the donor antenna 302 and a server antenna 304 for transmitting (or repeating) signals received by the repeater 120. Also, a second amplifier 306 amplifies signals received at the server antenna 304 and provides the amplified signals to the donor antenna 302. The repeater 120 may also comprise multiple antennae and/or multiple amplifiers, for receiving, amplifying, and transmitting the forward 122A, 124A and reverse link 124B, 122B signals separately.

Figure 4:
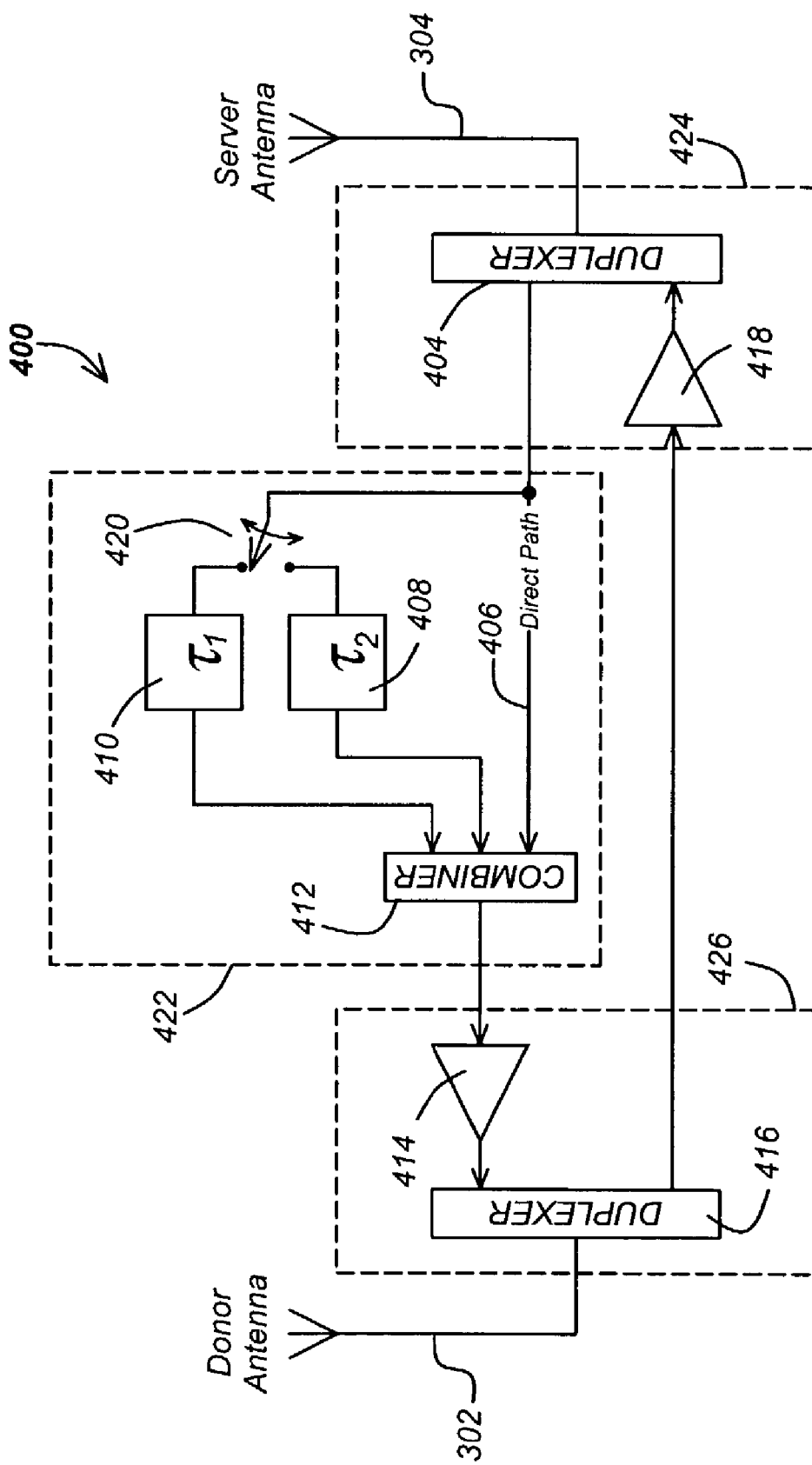
FIG. 4 is a block diagram of one embodiment of a repeater of the present invention employing delay modulation.

FIG. 4 is a block diagram of one embodiment of the repeater 400 of the present invention. In the illustrated embodiment, the repeater 400 comprises a server antenna 304 communicatively coupled to a transceiver 424. The transceiver 424 includes a receiver for receiving one or more transmissions (each of which is typically associated with a call either originating or directed to one of the remote stations) sensed by the server antenna 304 and a transmitter for transmitting information provided from the communicatively coupled second transceiver 426. In the illustrated embodiment, the transceiver 424 includes a duplexer 404 for converting simplex communications into duplex communications, and an amplifier 418 for amplifying the signal provided by the second transceiver 426. The foregoing can be implemented with separate transmit and receive antennas as well, in which case, the duplexers 404, 416 may be omitted.

The phrase "communicatively coupled" as it is used herein refers to a coupling between system elements wherein information is transmittable from one element to the other, whether such information is communicated directly, or via other system elements.

The first transceiver 424 is communicatively coupled to a discriminant processor 422. The discriminant processor accepts the received signal and processes the received signal to include a discriminant having a signature associated with the repeater. The discriminant processor 422 is communicatively coupled to the second transceiver 426. The second transceiver 426 includes a receiver and a transmitter, and accepts a signal from the discriminant processor 422 and transmits the signal via the donor antenna 302. The second transceiver 426 also receives signals sensed by the donor antenna 302, and provides the received signals to the first transceiver 424, for transmission via the server antenna 304.

The input to the discriminant processor 422 is selectively provided to a first delay element 410 and a second delay element via a switch 420, and thereafter to a combiner 412. The combiner 412 also accepts and combines the input to the discriminant processor 422 via a direct signal path 406, thus providing, at the output of the combiner, the input to the discriminant processor (via the direct signal path 406) and the input signal delayed by either $\tau_1$ or $\tau_2$ seconds.

The output of the combiner 412 is communicatively coupled to the second transceiver 426. The signal provided is then amplified by the amplifier 414 in the second transceiver 426 and provided to the donor antenna 302 for transmission.

Figure 5:
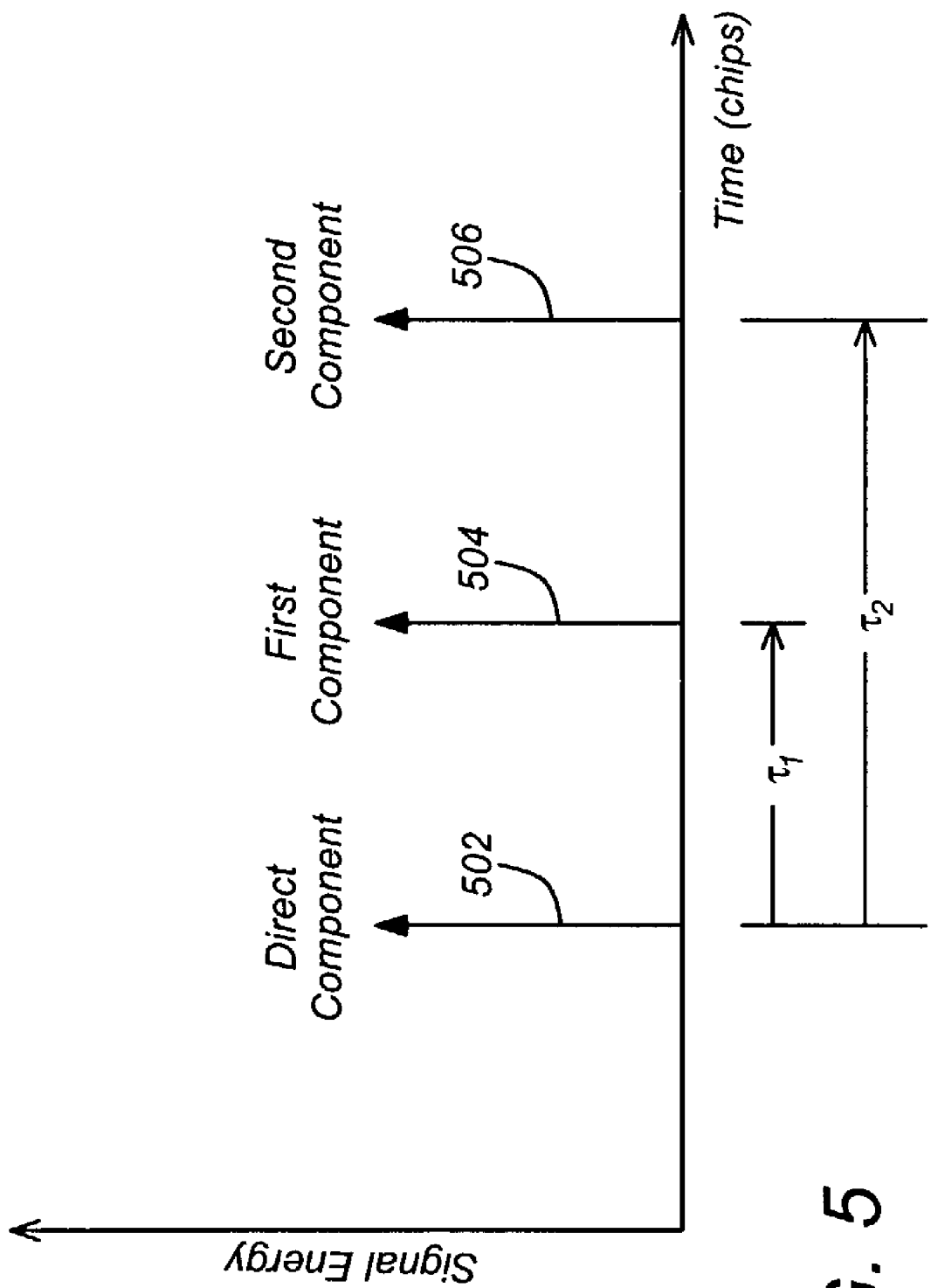
FIG. 5 is a diagram illustrating one embodiment of a signal transmitted by the second transceiver depicted in FIG. 4.

FIG. 5 is a diagram illustrating one embodiment of a signal transmitted by the second transceiver 426 depicted in FIG. 4. The horizontal axis depicts time, and in embodiments employing code division multiple access (CDMA) techniques, such time can be represented by chips. The transmitted signal includes a direct component 502 (via the direct signal path 406) as well as a second component which is selected by the switch 420 to be either the first 504 or second 506 delay modulated components. In one embodiment, the first 504 and second 506 delay modulated components are alternately selected to provide the repeater 120 signature, thus indicating not only that the signal was transmitted via the repeater 120, but also identifying which repeater was involved in the transmission.

Thus, by sampling and then delaying the entire return link envelope from the repeater by a few chips of time, the presence of a delayed signal can be used to mark the traffic as repeater traffic. As further described below, this delayed signal may be varied in a distinctive manner to permit identification at the cell station receiver (CSR) and not confused with natural multipath components. This reverse link signal and its perturbation would be visible at the finger tracking circuitry of the CSR and/or the searcher circuitry.

Typically, cellular telephone systems 100 include elements which allow the control station(s) 102 or the base station(s) 104 to control the transmitted power of the remote stations 112. Such power control subsystems prevent remote stations 112 that are disposed close to a particular base station 104 from overpowering signals from other remote stations are further away from the base station. While the aforementioned delay modulation technique provides an efficient discriminant with a signature allowing the repeater 120 to be defined, the consequential abrupt switching between delay components can cause problems with the power control subsystem. Consequently, it is beneficial to avoid abrupt switching between the delay components $\tau_1$ and $\tau_2$.

Figure 6:
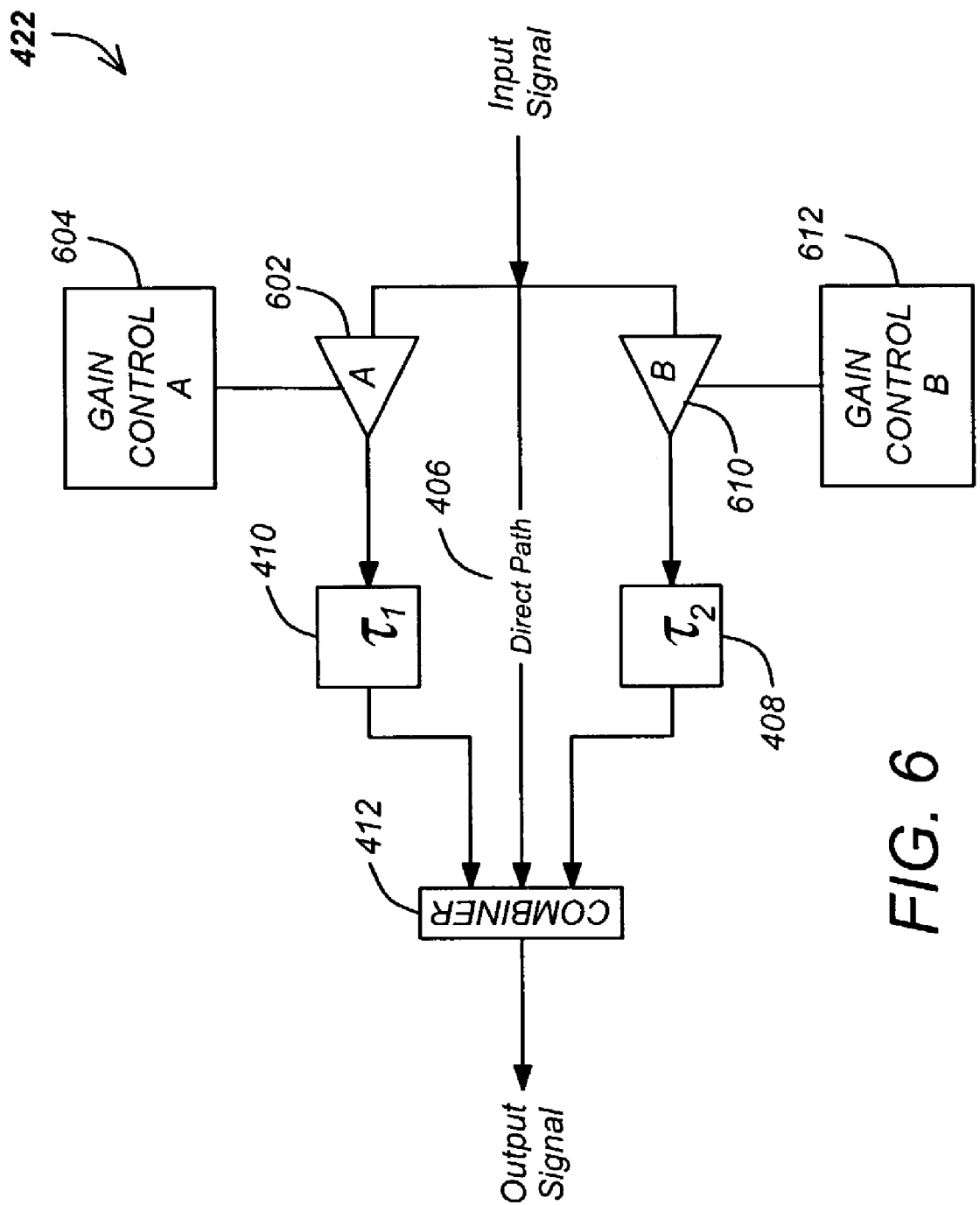
FIG. 6 is a diagram illustrating an alternative embodiment of the discriminant processor of the present invention.

FIG. 6 is a diagram illustrating an alternative embodiment of the discriminant processor 422 of the present invention. In this embodiment, the discriminant processor 422 includes a first amplifier 602 and a second amplifier 610, both communicatively coupled to receive the input signal from the transceiver 424. Each of the first amplifier 602 and the second amplifier 610 are variably controllable by gain controllers 604 and 612, respectively so that there is a smooth transition between each of the contributions from the delay elements to the total transmitted signal. The output of each variably controllable amplifier 602, 610 is communicatively coupled to delay elements 410 and 408. The output of the delay elements 410 and 408 are communicatively coupled to the combiner 412, which combines the signals from each delay element and the input signal via direct path 406 to produce an output signal that is supplied to the second transceiver 426 for eventual transmission via the donor antenna 302. The output signal (and hence the signal power of the signal transmitted by the second transceiver 426) is gradually transitioned between each of the delay components $\tau_1$ and $\tau_2$.

The gain of the amplifiers 602 and 610 (and hence, the contribution of input signal after processing by each of the delay elements) can be adjusted by the gain controllers 604 and 612 in many ways, so long as the output power of the signal provided by the second transceiver 426 adequately controlled.

Figure 7:
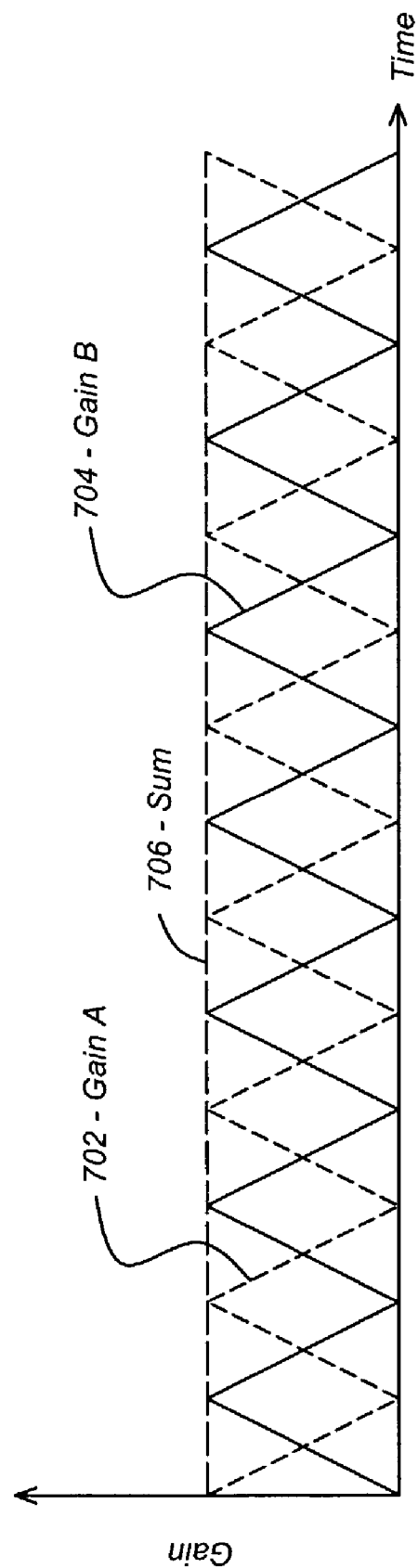
FIG. 7 is a diagram showing an exemplary control signals provided by the gain controllers.

FIG. 7 is a diagram showing an exemplary control signals provided by the gain controllers 604 and 612. In the illustrated example, the gain of both amplifiers 602 and 610 are controlled according to control signals 702 and 704 having a sawtooth or triangular shape. One of the control signals (e.g. control signal 704) is 180 degrees (or π radians) out of phase with the other. The result is that the sum of the delayed outputs of the two amplifiers 602 and 610 is substantially constant, and hence, the output of the combiner 412 and hence the second transceiver 426 is substantially constant as well.

Using the non-abrupt transition described above, delay components (such as those that are disclosed in FIG. 5 transition gracefully from one delay offset to the other (e.g. the delay component at time offset $\tau_1$ would begin to disappear while the delay component at time offset $\tau_2$ begins to appear. In addition to ameliorating some of the problems abrupt transitions would have on the power control system of the cellular telephone system 100, this also allows the discriminant signal and it's signature to be more easily tracked by the base station 104.

The term "substantially", when used in this context, refers to that amount of constancy that is required so as to not create objectionable power variations that adversely impact the performance of the power control system of the cellular telephone system 100. Further, in FIGS. 4 and 5, two delay components ($\tau_1$ and $\tau_2$) were used to illustrate the principles of the present invention. The present invention can also be implemented with one or more delay components (e.g. $\tau_1$, $\tau_2$, ..., $\tau_n$) as desired. If FM modulation, rather than delay modulation is employed, the output power of the reverse link will be substantially constant without controlling the amplifiers 602 and 610 with waveforms such as those described in FIG. 7.

Figure 8:
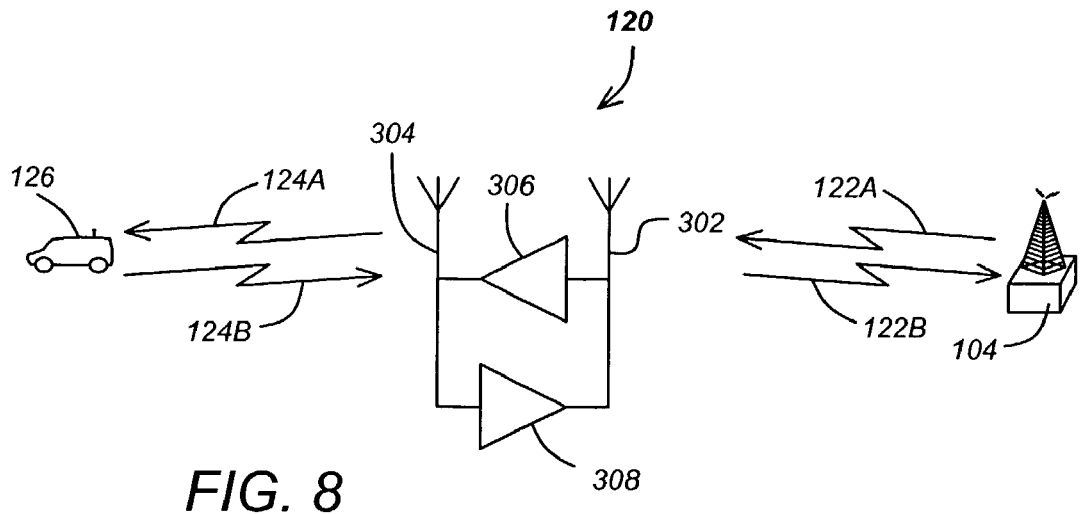
FIG. 8 presents a basic repeater configuration with respect to the orientation relative to remote station, the base station, and the repeater.
Figure 9:
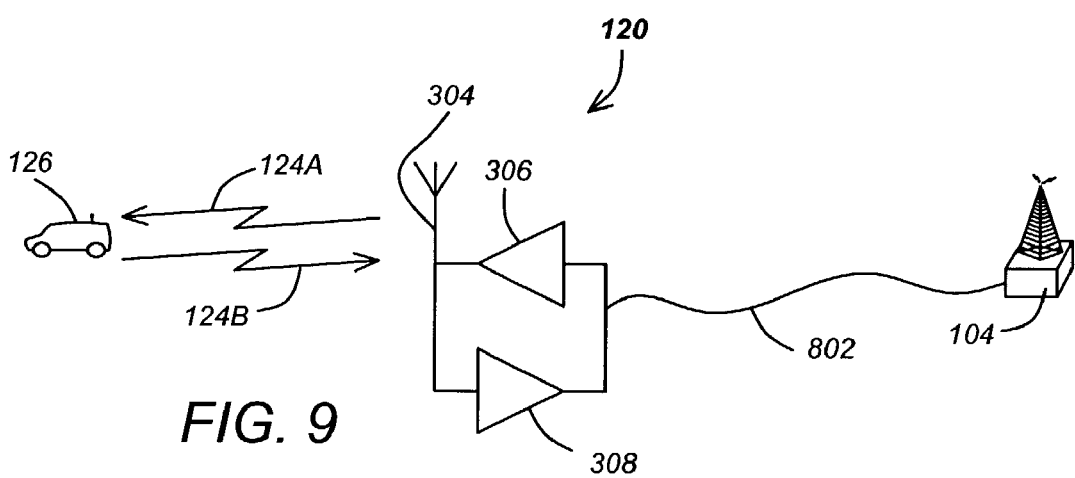
FIG. 9 is a diagram showing a repeater configuration in which the link from the repeater to the base station is accomplished via a landline such as a coaxial or fiber optic cable.
Figure 10:
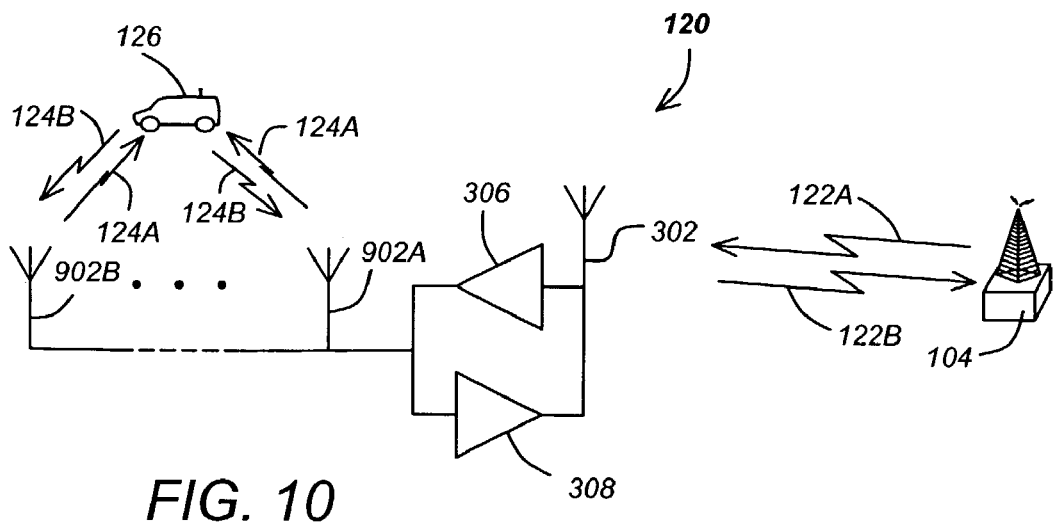
FIG. 10 is a diagram showing a repeater configuration in which the server antenna is not a single antenna, but a plurality of antennae distributed in a plurality of locations.

FIGS. 8–10 are diagrams illustrating repeater 120 configurations that can be used in conjunction with the present invention. FIG. 8 presents a basic repeater 120 configuration with respect to the orientation relative to remote station 126 the base station 104 and the repeater 120. In the embodiment illustrated in FIG. 8, the donor antenna 302 is directed at the base station 104 (or multiple base stations), while the server antenna 304 is generally directed at the remote station 126.

FIG. 9 is a diagram showing a repeater configuration in which the link from the repeater 120 to the base station 104 is accomplished via a landline 802 such as a coaxial or fiber optic cable.

FIG. 10 is a diagram showing a repeater configuration in which the server antenna 902 is not a single antenna, but a plurality of antennae 902A, 902B distributed in a plurality of locations. For example, the antennae 902A, 902B could be disposed on different floors of a building or along the length of a subway tunnel. The connection back to the base station 104 could be via land link (as shown in FIG. 9) or via a radio link (or optical link) as shown in FIG. 8.

Figure 11:
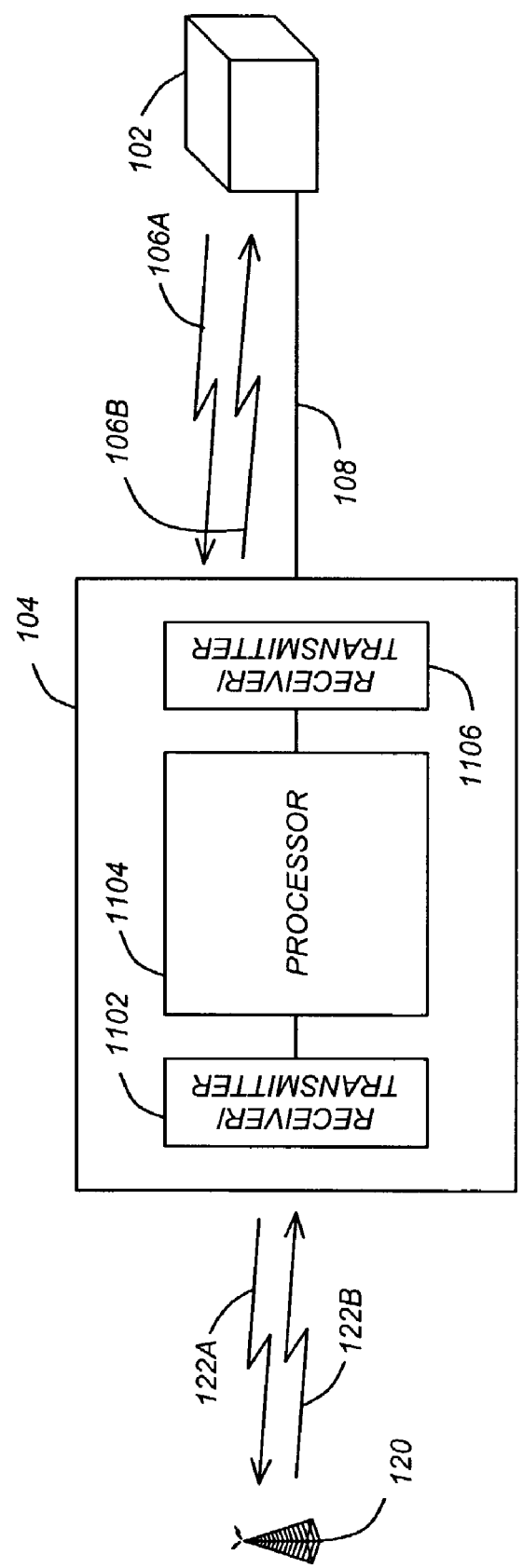
FIG. 11 is a diagram showing one embodiment of base station elements, which distinguishes signals received from the remote station via a repeater from signals received directly of the base station.

FIG. 11 shows one embodiment of base station 104 elements which distinguish signals received from the remote station 126 via a repeater 120 from signals received directly from the remote station 112. The base station 104 includes a first transceiver 1102 comprising a receiver and a transmitter for transceiving signals with either the remote stations 112, 126 or the repeater 120. The base station 104 also includes a processor 1104 communicatively coupled to the transceiver 1102, and a second transceiver 1106 communicatively coupled to the processor 1104. The second transceiver 1106 also includes a receiver and a transmitter.

The processor 1104 identifies received transmissions, some of which include the repeater-applied discriminant, and designates such received signal transmissions as being transmitted via the repeater 120. The processor 1104 also associates the designated signal characteristic with one or more of the monitoring characteristics described above. The processor 1104 may be a special purpose processor, specially designed hardware circuitry, or a combination of both, including both software and hardware modules.

Figure 12:
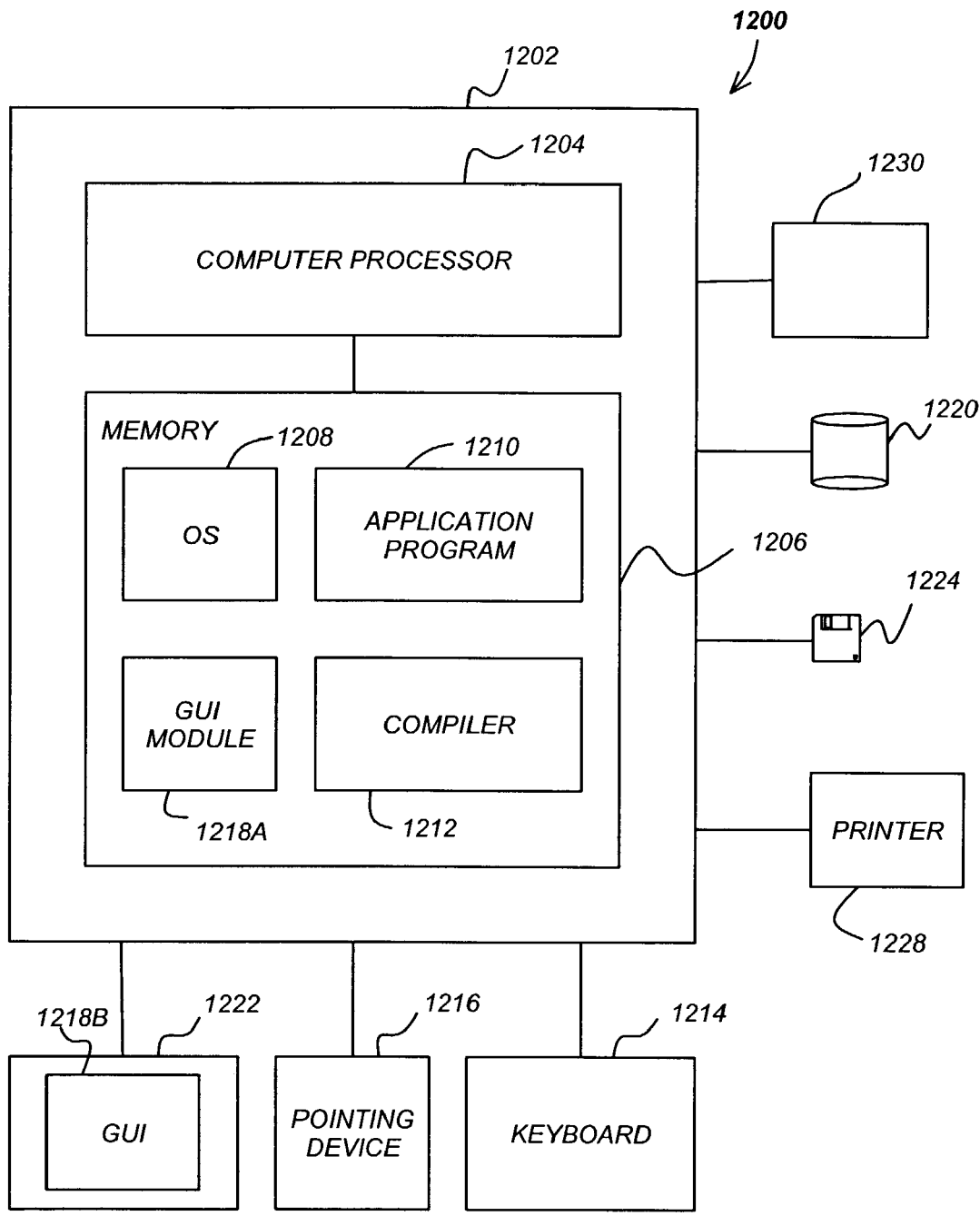
FIG. 12 is a diagram illustrating a computer system that may be used to implement the processor and other elements of the present invention.

FIG. 12 is a diagram illustrating a computer system 1200 that may be used to implement the processor 1104 and other elements of the present invention. The computer system 1200 comprises a computer 1202, including a computer processor 1204 and a memory, such as random access memory (RAM) 1206. The computer 1202 may be operatively coupled to a display 1222, which presents images such as windows to the user on a graphical user interface 1218B. The computer 1202 may also be coupled to other devices, such as a keyboard 1214, a mouse device 1216, a printer, etc. Any combination of the above components, or any number of different components, peripherals, and other devices, may be used with the computer 1202.

Generally, the computer 1202 operates under control of an operating system (OS) 1208 stored in the memory 1206, and interfaces with the user to accept inputs and commands and to present results through a graphical user interface (GUI) module 1218A. Although the GUI module 1218A is depicted as a separate module, the instructions performing the GUI functions can be resident or distributed in the operating system 1208, the computer program 1210, or implemented with special purpose memory and processors. The computer 1202 also implements a compiler 1212 which allows an application program 1210 written in a programming language such as COBOL, C++, FORTRAN, or other language to be translated into processor 1204 readable code. After completion, the application 1210 accesses and manipulates data stored in the memory 1206 of the computer 1202 using the relationships and logic that was generated using the compiler 1212. The computer 1202 also optionally comprises an external communication device such as a modem, satellite link, Ethernet card, or other device for communicating with other computers.

In one embodiment, instructions implementing the operating system 1208, the computer program 1210, and the compiler 1212 are tangibly embodied in a computer-readable medium, e.g., data storage device 1220, which could include one or more fixed or removable data storage devices, such as a zip drive, floppy disc drive 1224, hard drive, CD-ROM drive, tape drive, etc. Further, the operating system 1208 and the computer program 1210 are comprised of instructions which, when read and executed by the computer 1202, causes the computer 1202 to perform the steps necessary to implement and/or use the present invention. Computer program 1210 and/or operating instructions may also be tangibly embodied in memory 1206 and/or data communications devices 1230, thereby making a computer program product or article of manufacture according to the invention. As such, the terms "article of manufacture," "program storage device" and "computer program product" as used herein are intended to encompass a computer program accessible from any computer readable device or media.

The foregoing techniques and systems can also be applied to identify forward link transmissions (from the base station to the remote station) that are transmitted via a repeater as well.

Figure 13A:
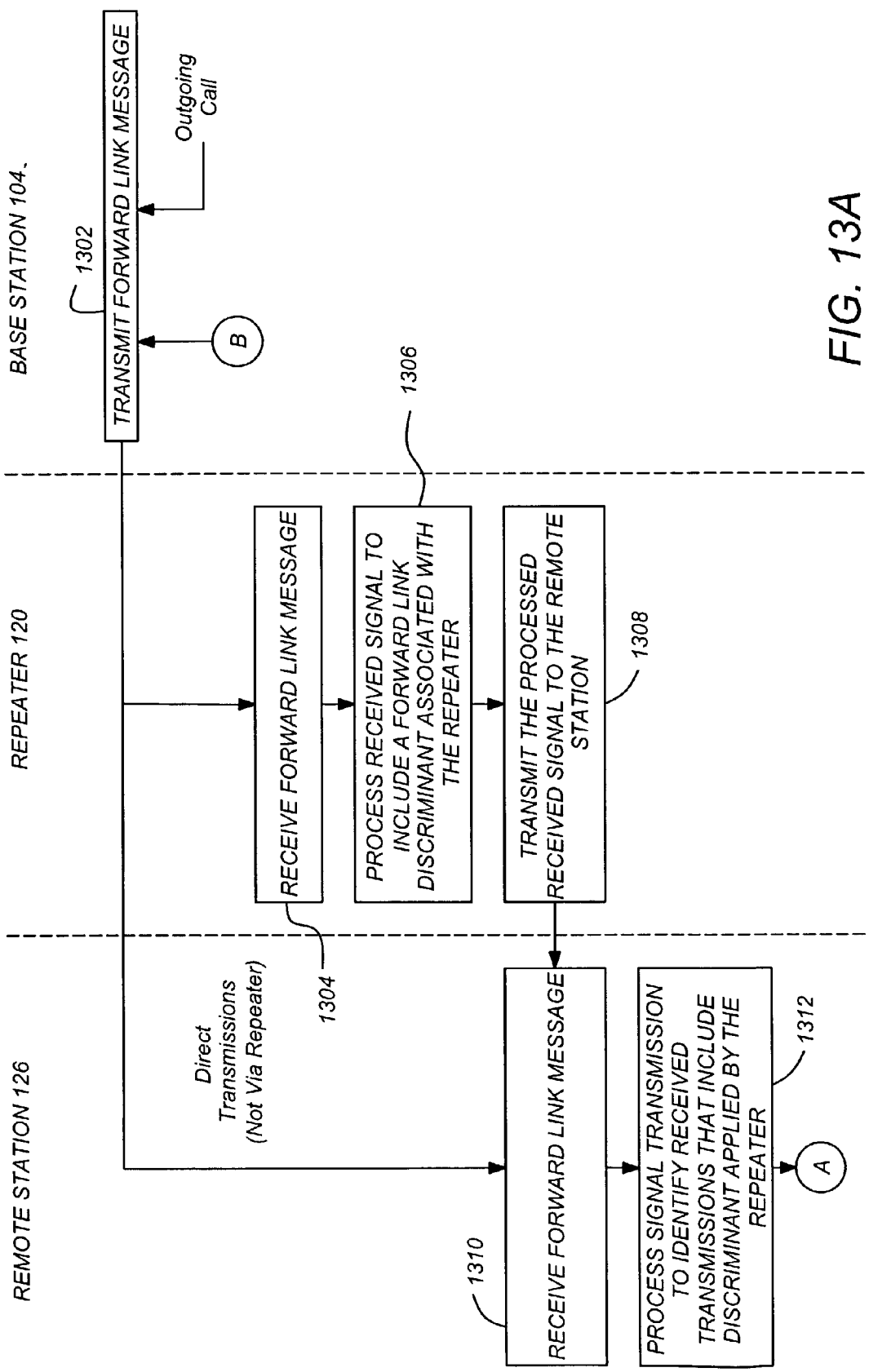
FIGS. 13A–13C are diagrams illustrating an embodiment of the present invention in which forward link communication transmitted via a repeater are identified with a discriminant.
Figure 13B:
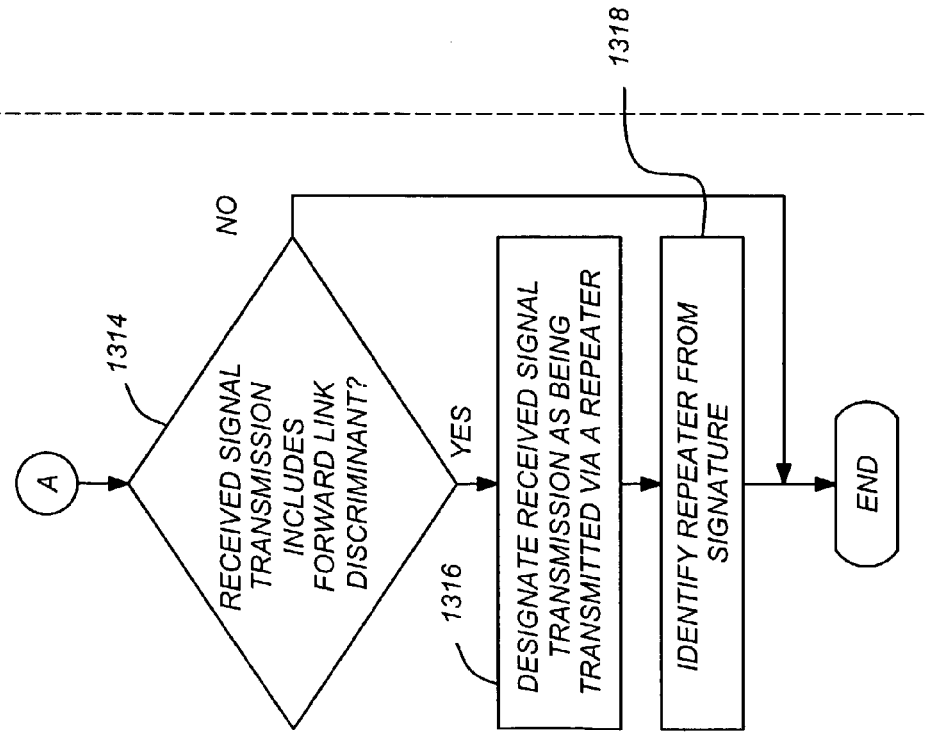
Figure 13C:
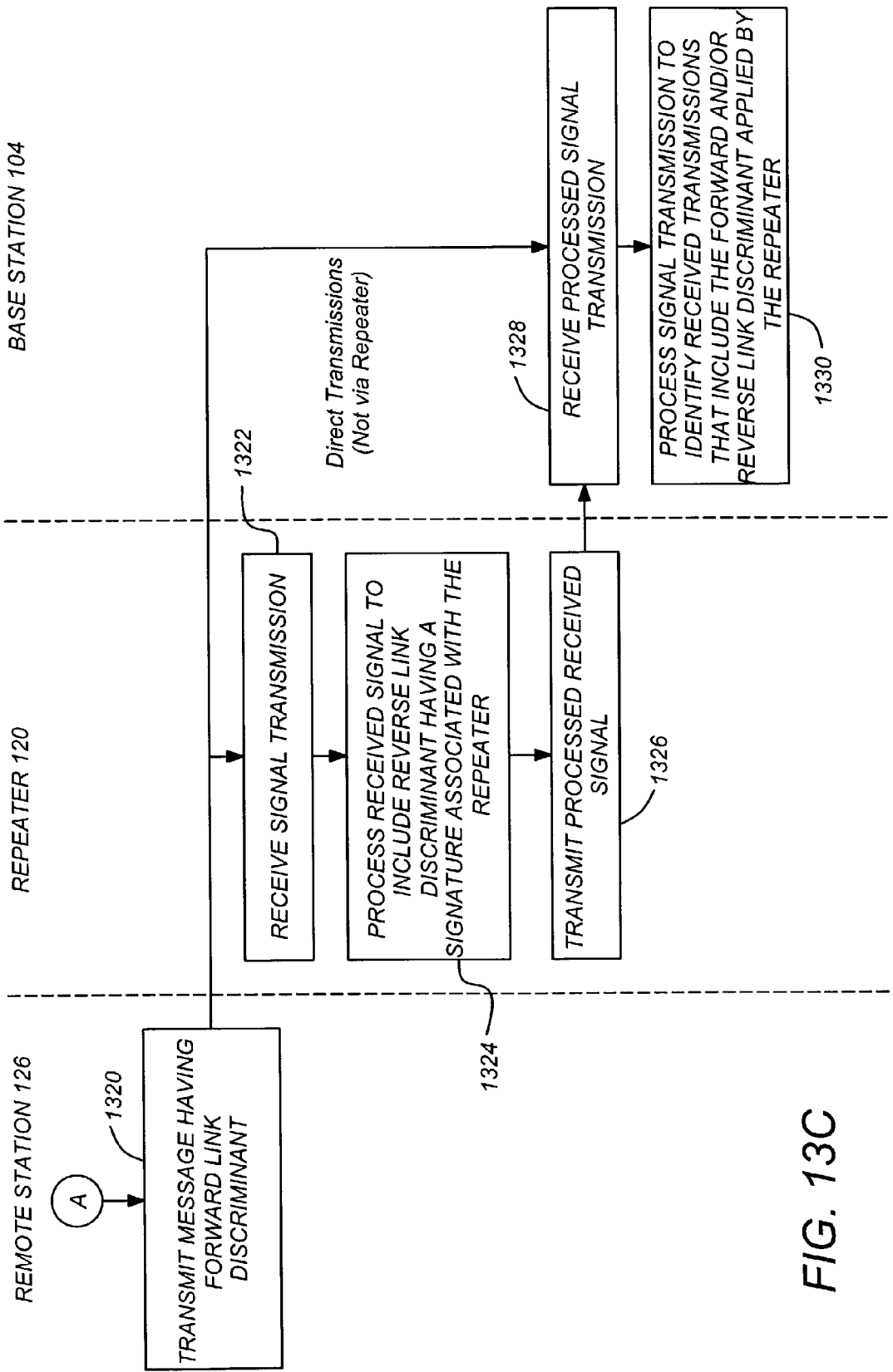

FIGS. 13A–13C are flow charts describing exemplary steps that can be used to identify forward link transmissions. An outgoing call (from a user of the PSTN 116 or the Internet 118, or a paging service, for example) or a return message in response to a call originating from the remote station 112 is transmitted by the base station 104 as shown in block 1302. If the remote station is within the base station 104 coverage area 114 (e.g. located as shown in FIG. 1 for remote station 112), the transmitted forward link signal can be received directly in the remote station, as shown in block 1310. However, if the remote station is outside of the base station 104 coverage area 114 (e.g. disposed as shown in FIG. 1 for remote station 126) transmitted forward link signal is received by the repeater 120 for transmission to the remote station, as shown in block 1304. As the remote station moves about, it may therefore receive forward link messages from a number of base stations, some of which having been transmitted via a repeater, and others transmitted directly from the base station without a repeater.

If the forward link signal is transmitted to the remote station 126 via the repeater 120, the repeater processes the received forward link signal to include a forward link discriminant associated with the repeater 120, and transmits the processed received signal with the forward link discriminant to the remote station 126, as shown in blocks 1306 and 1308. The remote station 126 receives the forward link transmission with the forward link discriminant, and processes the received transmissions to identify received transmissions that include the forward link discriminant. This is illustrated in blocks 1310 and 1312.

FIG. 13B is a flow chart illustrating exemplary steps that can be used to assess whether the received forward link signal was transmitted via a repeater, and if desired to identify the repeater. In this embodiment, this assessment is performed autonomously by the remote station 126. Referring to FIG. 13B, if the received forward link signal transmission includes the forward link discriminant, the received signal transmission is designated as being transmitted via a repeater. This is shown in blocks 1314 and 1316. If desired, the signature of the forward link discriminant can be used to determine not only the that the forward link signal was transmitted via the repeater 120, but to identify which repeater added the discriminant, as shown in block 1318. Also, if desired, the remote station 126 can store the information regarding the receipt of messages via the repeater. This information can be used, for example to assist the remote station 126 in determining its location, to determine service quality, or for other purposes.

FIG. 13C is a flow chart illustrating further exemplary steps that can be used to assess whether the received forward link signal was transmitted via a repeater, and if desired, to identify the repeater. In this embodiment, the assessment is performed in the base station. Referring to FIG. 13C, the remote station 126 transmits a message having the forward link discriminant to the base station 104. In one case, the message is transmitted directly to the base station 104 without the aid of a repeater 120. In this case, the message is received, and processed as previously described to identify transmissions that include the forward link discriminant, as shown in blocks 1328 and 1330. In another case, the message is transmitted to the base station 104 via a repeater 120. This repeater will typically be the same repeater that transmitted the forward link message to the remote station 126, but may not be so, as the remote station 126 may have moved from an area serviced by one repeater into an area serviced by another repeater during the interval between transmissions. The repeater 120 can simply forward the received signal transmission to the base station 104, or can add a reverse link discriminant to the received signal, as shown in block 1324. In this instance, the base station 104 would receive a message having both a forward and a reverse link discriminant, and would therefore be capable of determining that the message was transmitted via a first repeater in the forward link and via a second repeater on the reverse link.

It is noted that the repeaters 120 are capable of simultaneously applying a first watermark or other discriminant (e.g. FM) to the forward link, while simultaneously applying a second discriminant (e.g. AM) to the reverse link. This permits the remote stations 112/126 and the base stations 104 to simultaneously (and independently) determine when they have received a signal via a repeater 120.

It is noteworthy that the application of certain discriminants to the forward link signal passing through the repeater 120 can be sensed by both the remote station 126 and the base station 104 without applying a specific reverse link discriminant. Similarly, certain discriminants to the reverse link signal passing through the repeater 120 can be sensed by both the base station 104 and the remote station 126 without applying a specific forward link discriminant. As an example, cellular telephone systems 100 typically include elements that allow the control station(s) 102 or the base station(s) 104 to control the transmitted power of the remote stations 112 or 126. This is typically performed by measuring the strength or quality of the received signal from the remote station 112 or 126 and adjusting the remote station transmitter power via power control bits in the forward link.

In one embodiment, the entity controlling the power of the remote station 112 (base station 104 or control station 102), recognizes the discriminant applied by the repeater (e.g. in the form or amplitude modulated power from the repeater) by the characteristic amplitude changes in the reverse link signal. Having identified the repeater at the controller (104 and/or 102) the natural response of the system is to counteract the received power fluctuations by sending the appropriate power control adjustments on the forward link. Even though it is determined that the signal was from a repeater 120, the remote station is commanded to a different power level (e.g. by transmission of power control bits). The remote station then has access to this information to determine that the message it transmitted on the forward link was transmitted via a repeater 120. This determination can be performed autonomously, or with additional information from other system elements. For example, the AM discriminant added by the repeater 120 in the forward link can include a particular oscillation frequency that can be reliably attributed to the repeater-augmented discriminant rather than fading and other transmission phenomenon (which are typically more stochastic in nature).

In another embodiment, the controllers (104 and/or 102) identify the reverse link communication as being received via a repeater (perhaps also identifying the repeater). However, since it was determined that the signal was from a repeater 120, the remote station 112 is not commanded to a different power level (e.g. no power bits are transmitted). This prevents the remote station 112 from unnecessarily changing its transmitter power.

The foregoing ability to sense discriminants applied by the repeater 120 in the forward link by the remote station 126 and the base station 104 without applying a specific reverse link discriminant (or the ability to sense certain discriminants applied to the reverse link signal passing through the repeater 120 by both the base station 104 and the remote station 126 without applying a specific forward link discriminant) can be applied with other (e.g. non-power control related) discriminant types. For example, if the repeater 120 adjusts the carrier frequency on the forward link (e.g. by providing a small offset in frequency), the receiver in the MS 126 will track this. This capability (which is used, for example, to track doppler shifts) is present in many existing MS 126 units. This received frequency offset provides the MS 126 with a discriminant with which to identify the repeater 120.

The MS 126 or 112 includes a receiver local oscillator (LO) and a transmitter LO which operates at a frequency based on the receiver LO's frequency. As the MS 126 receiver tracks the frequency shifts from the repeater 120, these shifts will appear on the MS 126 transmitter. Hence, a discriminant is placed onto the reverse link and can be detected at the base station 104 receiver.

Those skilled in the art will recognize many modifications may be made to this configuration without departing from the scope of the present invention. For example, those skilled in the art will recognize that any combination of the above components, or any number of different components, peripherals, and other devices, may be used with the present invention. Further, the methods and procedures herein are applicable to repeaters in many types of communication systems, including other one-to-one communication systems (e.g. base-to-mobile or mobile-to-mobile, trunked, or non-trunked communications used by police, ambulance, and fire agencies), and in one-to-many communications systems using, for example, broadcast repeaters (e.g. digital television or digital audio broadcast repeaters).

CONCLUSION

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of monitoring communications traffic, comprising the steps of:
   receiving at least one of a plurality of signal transmissions wherein each of the signal transmissions is associated with a call associated with one of a plurality of remote stations;
   processing the plurality of received signal transmissions to identify received transmissions that include a discriminant applied by a repeater; and
   designating each of the plurality of received signal transmissions as being transmitted via the repeater if the received signal transmission includes the discriminant, wherein the monitoring characteristic is selected from a group comprising:
   a length of the call associated with the designated signal transmissions;
   a number of calls associated with the designated signal transmissions;
   a number of dropped calls associated with the designated signal transmissions;
   a call start time associated with the designated signal transmission;
   a frame error rate (FER) associated with the designated signal transmission;
   a receive power associated with the designated signal transmission; and
   a call type associated with the designated signal transmission.

2. The method of claim 1, further comprising the step of:
   associating the designated signal transmission with a monitoring characteristic.

3. A method comprising:
   receiving at least one of a plurality of signal transmissions wherein each of the signal transmissions is associated with a call associated with one of a plurality of remote stations;
   processing the plurality of received signal transmissions to identify received transmissions that include a discriminant applied by a repeater;
   designating each of the plurality of received signal transmissions as being transmitted via the repeater if the received signal transmission includes the discriminant, wherein the step of designating each of the plurality of received signal transmissions as being transmitted via the repeater if the received signal transmission includes the discriminant comprises the step of; designating each of the plurality of received signal transmissions as being transmitted via the repeater if the received signal transmission includes the discriminant and the discriminant includes a signature associated with the repeater;
   processing the plurality of signal transmissions to identify received transmissions that include the discriminant applied by a second repeater; and
   designating each of the plurality of received signal transmissions as being transmitted via the second repeater if the received signal transmission includes the discriminant and the discriminant includes a second signature associated with the second repeater.

4. The method of claim 3, wherein the discriminant comprises a frequency modulation applied to the signal transmission.

5. The method of claim 3, wherein the discriminant comprises an amplitude modulation applied to the signal transmission.

6. The method of claim 3, wherein the discriminant comprises an in-band tone.

7. The method of claim 3, wherein the discriminant comprises power control information received at the remote station.

8. A method comprising:
   receiving at least one of a plurality of signal transmissions wherein each of the signal transmissions is associated with a call associated with one of a plurality of remote stations;
   processing the plurality of received signal transmissions to identify received transmissions that include a discriminant applied by a repeater; and
   designating each of the plurality of received signal transmissions as being transmitted via the repeater if the received signal transmission includes the discriminant, wherein the discriminant includes a first delay modulated component of the signal transmission and the discriminant further includes a second delay component of the signal transmission.

9. The method of claim 8, wherein the first delay modulated component and the second delay modulated component each include a temporally varying characteristic.

10. The method of claim 9, wherein the temporally varying characteristic is a power.

11. The method of claim 10, wherein the sum of the power of the first delay modulated component and the power of the second delay modulated component are substantially constant.

12. The method of claim 8, wherein the plurality of signal transmissions are reverse link transmissions and the discriminant comprises a reverse link discriminant.

13. The method of claim 12, wherein the plurality of signal transmissions are received in a base station.

14. The method of claim 8, wherein the plurality of signal transmissions are forward link transmissions and the discriminant comprises a forward link discriminant.

15. The method of claim 14, wherein the plurality of signal transmissions are received in a remote station.

16. The method of claim 15, wherein the step of designating each of the plurality of received signal transmissions as being transmitted via the repeater if the received signal transmission includes a discriminant comprises the steps of:
 transmitting a signal having the forward link discriminant to a base station; and
 processing the signal having the forward link discriminant in the base station to identify received transmissions that include the forward link discriminant.

17. The method of claim 16, further comprising the steps of:
 receiving the message having the forward link discriminant in a repeater;
 processing the received message to include a reverse link discriminant;
 transmitting the processed message having the forward link discriminant and the reverse link discriminant to a base station; and
 processing the signal having the forward link discriminant and the reverse link discriminant to identify received transmissions having the forward link discriminant and the reverse link discriminant.

18. The method of claim 8, further comprising the steps of:
 controlling at least one of set of parameters associated with the repeater based on the whether the plurality of received signal transmissions are being transmitted via the repeater.

19. The method of claim 18, wherein the at least one of a set of parameters is selected from a group comprising:
 a repeater forward link gain;
 a repeater reverse link gain;
 repeater activation;
 repeater deactivation;
 repeater forward link frequency;
 repeater forward link bandwidth;
 repeater reverse lint frequency;
 repeater reverse link bandwidth; and
 repeater rebroadcast channels.

20. An apparatus for identifying communications transmitted via a repeater, comprising:
 a receiver configured to receive a plurality of signal transmissions, wherein each of the signal transmissions is associated with a call originating from or directed to one of the plurality of remote stations; and
 a processor, communicatively coupled to the receiver, the processor configured to identify received transmissions that include a discriminant applied by a repeater and to designate each of the plurality of received signal transmissions as being transmitted via the repeater if the received signal transmission includes the discriminant,
 wherein the processor further associates the designated signal transmission with a monitoring characteristic and wherein the monitoring characteristic is selected from the group comprising:
 a length of the call associated with the designated signal transmissions;
 a number of calls associated with the designated signal transmissions;
 a number of dropped calls associated with the designated signal transmissions;
 a call start time associated with the designated signal transmission;
 a frame error rate (FER) associated with the designated signal transmission;
 a receive power associated with the designated signal transmission; and
 a call type associated with the designated signal transmission.

21. The apparatus of claim 20, wherein the processor is configured to designate each of the plurality of received signal transmissions as being transmitted via the repeater if the received signal transmission includes the discriminant and the discriminant includes a signature associated with the repeater.

22. The apparatus of claim 21, wherein the discriminant comprises a frequency modulation applied to the signal transmission from the remote station.

23. An apparatus for identifying communications transmitted via a repeater, comprising:
 a receiver configured to receive a plurality of signal transmissions, wherein each of the signal transmissions is associated with a call originating from or directed to one of the plurality of remote stations; and
 a processor, communicatively coupled to the receiver, the processor configured to identify received transmissions that include a discriminant applied by a repeater and to designate each of the plurality of received signal transmissions as being transmitted via the repeater if the received signal transmission includes the discriminant,
 wherein the discriminant includes a first delay modulated component of the signal transmission and wherein the discriminant further includes a second delay modulated component of the signal transmission.

24. The apparatus of claim 23, wherein the first delay modulated component and the second delay modulated component each include a temporally varying characteristic.

25. The apparatus of claim 24, wherein the temporally varying characteristic is a power.

26. The apparatus of claim 25, wherein the sum of the power of the first delay modulated component and the power of the second delay modulated component are substantially constant.

27. The apparatus of claim 23, wherein the plurality of signal transmissions are reverse link transmissions and the discriminant comprises a reverse link discriminant.

28. An apparatus for identifying communications transmitted via a repeater, comprising:
 means for receiving at least one of a plurality of signal transmissions, wherein each of the signal transmissions is associated with a call associated with one of a plurality of remote stations;
 means for processing the plurality of received signal transmissions to identify received transmissions that include a discriminant applied by a repeater;

means for designating each of the plurality of received signal transmissions as being transmitted via the repeater if the received signal transmission includes the discriminant, wherein the means for designating each of the plurality of received signal transmissions as being transmitted via the repeater if the received signal transmission includes the discriminant comprises:
means for designating each of the plurality of received signal transmissions as being transmitted via the repeater if the received signal transmission includes the discriminant and the discriminant includes a signature associated with the repeater;
means for processing the plurality of signal transmissions to identify received transmissions that include the discriminant applied by a second repeater; and
means for designating each of the plurality of received signal transmissions as being transmitted via the second repeater if the received signal transmission includes the discriminant and the discriminant includes a second signature associated with the second repeater.

29. The apparatus of claim 33, wherein the discriminant comprises a frequency modulation applied to the signal transmission from the remote station.

30. An apparatus for identifying communications transmitted via a repeater, comprising:
means for receiving at least one of a plurality of signal transmissions, wherein each of the signal transmissions is associated with a call associated with one of a plurality of remote stations;
means for processing the plurality of received signal transmissions to identify received transmissions that include a discriminant applied by a repeater; and
means for designating each of the plurality of received signal transmissions as being transmitted via the repeater if the received signal transmission includes the discriminant,
wherein the discriminant includes a first delay modulated component of the signal transmission and wherein the discriminant further includes a second delay component of the signal transmission.

31. The apparatus of claim 27, wherein the plurality of signal transmissions are received in a base station.

32. The apparatus of claim 23, wherein the plurality of signal transmissions are forward link transmissions and the discriminant comprises a forward link discriminant.

33. The apparatus of claim 29, wherein the plurality of signal transmissions are received in a remote station.

34. An apparatus for identifying communications transmitted via a repeater, comprising:
means for receiving at least one of a plurality of signal transmissions, wherein each of the signal transmissions is associated with a call associated with one of a plurality of remote stations;
means for processing the plurality of received signal transmissions to identify received transmissions that include a discriminant applied by a repeater; and
means for designating each of the plurality of received signal transmissions as being transmitted via the repeater if the received signal transmission includes the discriminant,
wherein the monitoring characteristic is selected from a group comprising:
a length of the call associated with the designated signal transmissions;
a number of calls associated with the designated signal transmissions;
a number of dropped calls associated with the designated signal transmissions;
a call start time associated with the designated signal transmission;
a frame error rate (FER) associated with the designated signal transmission;
a receive power associated with the designated signal transmission; and
a call type associated with the designated signal transmission.

35. The apparatus of claim 31, further comprising:
means for associating the designated signal transmission with a monitoring characteristic.

36. The apparatus of claim 35, wherein the first delay modulated component and the second delay modulated component each include a temporally varying characteristic.

37. The apparatus of claim 36, wherein the temporally varying characteristic is a power.

38. The apparatus of claim 37, wherein the sum of the power of the first delay modulated component and the power of the second delay modulated component are substantially constant.

39. The apparatus of claim 35, wherein the plurality of signal transmissions are reverse link transmissions and the discriminant comprises a reverse link discriminant.

40. The apparatus of claim 35, wherein the plurality of signal transmissions are received in a base station.

41. The apparatus of claim 40, wherein the plurality of signal transmissions are forward link transmissions and the discriminant comprises a forward link discriminant.

42. The apparatus of claim 35, wherein the plurality of signal transmissions are received in a remote station.

43. The apparatus of claim 42, wherein the means for designating each of the plurality of received signal transmissions as being transmitted via the repeater if the received signal transmission includes a discriminant comprises:
means for transmitting a signal having the forward link discriminant to a base station; and
means for processing the signal having the forward link discriminant in the base station to identify received transmissions that include the forward link discriminant.

44. The apparatus of claim 42, further comprising:
means for receiving the message having the forward link discriminant in a repeater;
means for processing the received message to include a reverse link discriminant;
means for transmitting the processed message having the forward link discriminant and the reverse link discriminant to a base station; and
means for processing the signal having the forward link discriminant and the reverse link discriminant to identify received transmissions having the forward link discriminant and the reverse link discriminant.

45. A program storage device, readable by a computer, tangibly embodying at least one program of instructions executable by the computer to perform method steps of identifying communications transmitted via a repeater from remote communications not transmitted via the repeater, the method comprising the steps of:
receiving a plurality of signal transmissions from a plurality of remote stations, wherein each of the signal transmissions is associated with a call associated with one of the plurality of remote stations;
processing the plurality of received signal transmissions to identify received transmissions that include a discriminant applied by a repeater; and designating each of the plurality of received signal transmissions as being transmitted via the repeater if the received signal transmission includes the discriminant, wherein the discriminant includes a first delay modulated component of the signal transmission and wherein the discriminant further includes a second delay component of the signal transmission.

46. A method of distinguishing communications transmitted via a repeater from communications not transmitted via the repeater, comprising the steps of:
receiving a signal transmission in the repeater;
processing the received signal to include a discriminant having a signature associated with the repeater, wherein the step of processing the received signal to include a discriminant having a signature associated with the repeater comprises the step of: augmenting the signal transmission with a first delay modulated component of the signal transmission and augmenting the signal transmission with a second delay modulated component of the signal transmission; and
transmitting the processed received signal.

47. The method of claim 46, wherein the processed received signal is transmitted to a base station.

48. The method of claim 46, wherein the processed received signal is transmitted to a remote station.

49. The method of claim 46, wherein the step of processing the received signal to include the discriminant having the signature associated with the repeater comprises the step of:
augmenting the received signal with the discriminant.

50. The method of claim 46, wherein the step of processing the received signal to include the discriminant having the signature associated with the repeater comprises the step of:
modifying the signal according to the discriminant.

51. The method of claim 46, wherein the step of processing the received signal to include a discriminant having a signature associated with the repeater comprises the step of:
augmenting the signal transmission with a component of the signal transmission delayed by a time period alternately selected between a first time delay and a second time delay.

52. The method of claim 46, wherein the step of processing the received signal to include a discriminant having a signature associated with the repeater comprises the step of:
augmenting the signal transmission with a first component of the signal transmission delayed by a first time delay;
augmenting the signal transmission with a second component of the signal transmission delayed by a second time delay;
wherein the sum of the power of the first component of the signal transmission and the second component of the second component of the signal transmission is temporally constant.

53. The method of claim 52, wherein the power of the first component of the signal transmission and the power of the second component of the signal transmission are individually temporally variant.

54. The method of claim 46, wherein the repeater comprises a digital television or a digital audio repeater.

55. An apparatus for distinguishing communications transmitted via a repeater from communications not transmitted via the repeater, comprising:
means for receiving a signal transmission in the repeater;
means for processing the received signal to include a discriminant having a signature associated with the repeater, wherein the means for processing the received signal to include a discriminant having a signature associated with the repeater comprises: means for augmenting the signal transmission with a first delay modulated component of the signal transmission and means for augmenting the signal transmission with a second delay modulated component of the signal transmission; and
means for transmitting the processed received signal.

56. The apparatus of claim 55, wherein the means for processing the received signal to include the discriminant having the signature associated with the repeater comprises:
means for augmenting the received signal with the discriminant.

57. The apparatus of claim 55, wherein the means for processing the received signal to include the discriminant having the signature associated with the repeater comprises:
means for modifying the signal according to the discriminant.

58. The apparatus of claim 55, wherein the means for processing the received signal to include a discriminant having a signature associated with the repeater comprises:
means for augmenting the signal transmission with a first frequency modulated discriminant.

59. The apparatus of claim 55, wherein the means for processing the received signal to include a discriminant having a signature associated with the repeater comprises:
means for augmenting the signal transmission with a component of the signal transmission delayed by a time period alternately selected between a first time delay and a second time delay.

60. The apparatus of claim 55, wherein the means for processing the received signal to include a discriminant having a signature associated with the repeater comprises:
means for augmenting the signal transmission with a first component of the signal transmission delayed by a first time delay;
means for augmenting the signal transmission with a second component of the signal transmission delayed by a second time delay; and
wherein the sum of the power of the first component of the signal transmission and the second component of the second component of the signal transmission is temporally constant.

61. The apparatus of claim 60, wherein the power of the first component of the signal transmission and the power of the second component of the signal transmission are individually temporally variant.

62. A repeater for transmitting communications distinguishable as being transmitted by the repeater, comprising:
a receiver for receiving a signal transmission;
a discriminant processor, communicatively coupled to the receiver, for augmenting the received signal transmission with a discriminant having a signature associated with the repeater; and
a transmitter, communicatively coupled to the discriminant processor, for transmitting the augmented received signal, wherein the discriminant processor comprises:
a first delay element, communicatively coupled to the receiver;
a combiner, communicatively coupled to the delay element and the transmitter, for combining a delayed signal transmission from the delay element with the received signal transmission, wherein the first delay element is communicatively coupled to the receiver via a switch, and the repeater further comprises:
a second delay element, communicatively coupled to the receiver via the switch and to the combiner.

63. The repeater of claim 62, wherein the discriminant is a frequency modulated discriminant.

64. The repeater of claim 62, wherein the discriminant processor comprises:
- a gain controller, communicatively coupled to the receiver, for providing a first variably amplified received signal transmission and a second variably amplified received signal transmission;
- a first delay element, communicatively coupled to the gain controller; and
- a second delay element, communicatively coupled to the gain controller.

65. The repeater of claim 64, wherein the gain controller controls an output of the discriminant processor so that the sum of the power of an output of the first delay element and an output of the second delay element is substantially constant.

66. The repeater of claim 64, wherein the gain controller comprises:
- a first amplifier having a variable gain, communicatively coupled to the receiver and the first delay element; and
- a second amplifier having a variable gain, communicatively coupled to the receiver and the second delay element.

67. The repeater of claim 66, further comprising a combiner communicatively coupled to the first delay element, the second delay element, and the receiver.

* * * * *